US010723181B2

(12) United States Patent
Kishizoe et al.

(10) Patent No.: US 10,723,181 B2
(45) Date of Patent: Jul. 28, 2020

(54) PNEUMATIC TIRE WITH SPECIFIED TREAD RUBBER LAYER THICKNESS AND SOUND-ABSORBING MEMBER WIDTH

(71) Applicant: The Yokohama Rubber Co., LTD., Minato-ku, Tokyo (JP)

(72) Inventors: Isamu Kishizoe, Hiratsuka (JP); Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 616 days.

(21) Appl. No.: 15/113,038

(22) PCT Filed: Dec. 9, 2014

(86) PCT No.: PCT/JP2014/082557
§ 371 (c)(1),
(2) Date: Jul. 20, 2016

(87) PCT Pub. No.: WO2015/111314
PCT Pub. Date: Jul. 30, 2016

(65) Prior Publication Data
US 2017/0008353 A1    Jan. 12, 2017

(30) Foreign Application Priority Data

Jan. 23, 2014 (JP) ................................ 2014-010415

(51) Int. Cl.
*B60C 19/00* (2006.01)
*B60C 11/00* (2006.01)
(Continued)

(52) U.S. Cl.
CPC .............. *B60C 19/002* (2013.01); *B60C 9/22* (2013.01); *B60C 9/2204* (2013.01); *B60C 9/28* (2013.01);
(Continued)

(58) Field of Classification Search
CPC ........... B60C 19/002; B60C 2011/0033; B60C 11/0008; B60C 11/00; B60C 9/22;
(Continued)

(56) References Cited

U.S. PATENT DOCUMENTS 4,869,307 A * 9/1989 Bormann .............. B60C 9/2204
152/533
5,277,238 A 1/1994 Kawabata et al.
(Continued)

FOREIGN PATENT DOCUMENTS

| JP | H04-015106 | 1/1992 |
|----|------------|--------|
| JP | H04-0197804 | 7/1992 |

(Continued)

OTHER PUBLICATIONS

English machine translation of JD 2012-136188 A, dated Jul. 19, 2012.*
(Continued)

*Primary Examiner* — Adrienne C. Johnstone
(74) *Attorney, Agent, or Firm* — Thorpe North & Western

(57) ABSTRACT

The present technology provides a pneumatic tire having a strip-shaped sound-absorbing member bonded on the inner surface of the tire includes a plurality of belt layers, two or more belt cover layers, one or more belt edge cover layers, and a thread rubber layer. The thickness of the tread rubber layer is substantially uniform in the region X where the sound-absorbing member is located so that the difference between the thickness $t_1$ at an end of the sound-absorbing member and the thickness $t_0$ at the position of the tire equator is equal to or less than 0.5 mm. The thickness of the tread rubber layer is smaller in the region Y where the belt edge cover layer is located than in the region X so that the difference between the minimum value $t_2$ of the thickness in the region Y and the thickness $t_0$ ranges from 1.0 to 4.0 mm.

12 Claims, 5 Drawing Sheets

(51) Int. Cl.
  *B60C 11/03*  (2006.01)
  *B60C 9/22*   (2006.01)
  *B60C 9/28*   (2006.01)
  *B60C 9/30*   (2006.01)
(52) U.S. Cl.
  CPC ............ *B60C 9/30* (2013.01); *B60C 11/0008* (2013.01); *B60C 11/033* (2013.01); *B60C 11/0304* (2013.01); *B60C 2009/2214* (2013.01); *B60C 2009/2219* (2013.01); *B60C 2009/2266* (2013.01); *B60C 2011/0033* (2013.01); *B60C 2011/0381* (2013.01); *B60C 2011/0388* (2013.01)
(58) Field of Classification Search
  CPC .......... B60C 9/2204; B60C 2009/2219; B60C 2009/2266
  See application file for complete search history.

(56) References Cited

U.S. PATENT DOCUMENTS

| | | | |
|---|---|---|---|
| 5,396,941 A | 3/1995 | Iuchi | |
| 2005/0098251 A1 | 5/2005 | Yukawa | |
| 2010/0288414 A1 | 11/2010 | Ueda | |
| 2013/0160914 A1 | 6/2013 | Oba | |
| 2016/0297261 A1* | 10/2016 | Tanno | ................. B60C 19/002 |
| 2018/0162180 A1* | 6/2018 | Tanno | ................. B60C 19/002 |

FOREIGN PATENT DOCUMENTS

| | | |
|---|---|---|
| JP | H11-0222013 | 8/1999 |
| JP | 2000-233604 | 8/2000 |
| JP | 2002-067608 | 3/2002 |
| JP | 2005-138760 | 6/2005 |
| JP | 2010-173573 | 8/2010 |
| JP | 2010-208367 | 9/2010 |
| JP | 2011-020479 | 2/2011 |
| JP | 2012-086600 | 5/2012 |
| JP | 2012-136188 | 7/2012 |
| WO | WO 2008/035771 | 3/2008 |
| WO | WO 2012/050000 | 4/2012 |

OTHER PUBLICATIONS

International Search Report for International Application No. PCT/JP2014/082557 dated Mar. 17, 2015, 5 pages, Japan.

* cited by examiner

PNEUMATIC TIRE WITH SPECIFIED TREAD RUBBER LAYER THICKNESS AND SOUND-ABSORBING MEMBER WIDTH

TECHNICAL FIELD

The present technology relates to a pneumatic tire having a strip-shaped sound-absorbing member bonded to a region on the tire inner surface corresponding to the tread portion, and more particularly relates to a pneumatic tire capable of maintaining excellent high-speed durability, with reduced strain of the tire inner surface due to centrifugal force during high-speed traveling, and with reduced peeling of the sound-absorbing member.

BACKGROUND ART

In pneumatic tires, cavernous resonance caused by the vibration of air that the tire is filled with is one cause of noise being generated. When a tire is rolled, uneven treading surfaces cause a tread portion to vibrate. The vibrations of the tread portion cause the air inside the tire to vibrate which causes cavernous resonance to be generated.

As a way to reduce the noise caused by this cavity resonance, it has been proposed that a sound-absorbing member be provided within the cavity between the tire and the rim of the wheel. More specifically, a strip-shaped sound-absorbing member is bonded to a region of the tire inner surface corresponding to the tread portion (for example, see Japanese Unexamined Patent Application Publication Nos. 2002-67608A and 2005-138760A).

However, radial growth is produced by centrifugal force during high-speed traveling, so this produces a shear strain in the bonding surface of the sound-absorbing member. Then after the bonding surface of the sound-absorbing member that is bonded to the tire inner surface has been subjected to shear strain repetitively over a long period of time, the problem of peeling of the sound-absorbing member from the tire inner surface can occur.

Also, in the pneumatic tire, a plurality of belt layers is disposed on the outer circumferential side of the carcass layer in the tread portion, and a belt cover layer made from organic fiber cords oriented in the tire circumferential direction is disposed on the outer circumferential side of these belt layers, so the high-speed durability is increased. Aliphatic polyamide fiber cords as typified by nylon fiber cords are widely used as the organic fiber cords of this type of belt cover layer. However, although nylon fiber cords are excellent from the cost point of view, they cannot necessarily sufficiently withstand the shear strain of the tire inner surface produced by centrifugal force during high-speed traveling, so at present they are unable to reduce peeling of the sound-absorbing member.

SUMMARY

The present technology provides a pneumatic tire having a strip-shaped sound-absorbing member bonded to a region on the tire inner surface corresponding to the tread portion, that is capable of maintaining excellent high-speed durability, capable of reducing strain of the tire inner surface due to centrifugal force during high-speed traveling, and capable of reducing peeling of the sound-absorbing member.

The pneumatic tire according to the present technology includes: an annular tread portion extending in the tire circumferential direction; a pair of sidewall portions disposed on two sides of the tread portion; a pair of bead portions disposed on the inner side in the tire radial direction of the sidewall portions; and a strip-shaped sound-absorbing member bonded to a region of the tire inner surface corresponding to the tread portion along the tire circumferential direction via an adhesive layer. A carcass layer is provided between the pair of bead portions, and a plurality of belt layers is disposed on the outer circumferential side of the carcass layer in the tread portion. A belt cover layer made from two or more layers of aliphatic polyamide fiber cords oriented in the tire circumferential direction is disposed on the outer circumferential side of the belt layer extending over the whole width of the belt layer. A belt edge cover layer made from one or more layers of aliphatic polyamide fiber cords oriented in the tire circumferential direction is disposed on the outer circumferential side of the belt cover layer so as to cover the two edges of the belt layer. A tread rubber layer is disposed on the outer circumferential side of the belt cover layer and the belt edge cover layer. The sound-absorbing member is disposed on the inner side in the tire width direction of the belt edge cover layer. The thickness of the tread rubber layer is substantially constant in the region over which the sound-absorbing member is disposed, and the difference in the thickness of the tread rubber layer at the position of the edges of the sound-absorbing member and the thickness of the tread rubber layer at the position of the tire equator is not more than 0.5 mm. The thickness of the tread rubber layer in the range over which the belt edge cover layer is disposed is smaller than the thickness over the range in which the sound-absorbing member is disposed. The difference between the minimum value of the thickness of the tread rubber layer over the range in which the belt edge cover layer is disposed and the thickness of the tread rubber layer at the position of the tire equator is from 1.0 to 4.0 mm.

In the present technology, in the pneumatic tire with the strip-shaped sound-absorbing member bonded along the tire circumferential direction to a region of the tire inner surface corresponding to the tread portion, two or more layers of the belt cover layer made from aliphatic polyamide fiber cords oriented in the tire circumferential direction are disposed on the outer circumferential side of the belt layer over the whole width of the belt layer. One or more layers of the belt edge cover layer made from aliphatic polyamide fiber cords oriented in the tire circumferential direction are disposed on the outer circumferential side of the belt cover layer so as to cover the two edges of the belt layer. Therefore sufficient hoop effect can be provided based on the belt cover layer and the belt edge cover layer, even when low cost aliphatic polyamide fiber cords are used for the belt cover layer and the belt edge cover layer. As a result the strain induced in the tire inner surface due to radial growth caused by centrifugal force during high-speed traveling is reduced, so the adhesive layer of the sound-absorbing member can easily follow the tire inner surface, and peeling of the sound-absorbing member can be reduced.

Moreover, the thickness of the tread rubber layer in the range where the sound-absorbing member is disposed is substantially constant, and the difference in the thickness of the tread rubber layer at the positions of the sound-absorbing member edges and the thickness of the tread rubber layer at the tire equator position is not more than 0.5 mm, so the effect of reducing the strain in the tire inner surface when the tread portion makes ground contact can be increased. Also, in the shoulder region of the tread portion generally heat build-up tends to be large at the position where the belt edge cover layer is disposed. However the thickness of the tread rubber layer in the region where the belt edge cover layer is disposed is less than the thickness in the region where the sound-absorbing member is disposed. Also the difference between the minimum value of the thickness of the tread rubber layer in the region where the belt edge cover layer is disposed and the thickness of the tread rubber layer at the tire equator position is from 1.0 to 4.0 mm. Therefore the heat build-up at the position where the belt edge cover layer is disposed is reduced, and excellent high-speed durability can be exhibited. In this way excellent high-speed durability can be maintained, strain of the tire inner surface due to centrifugal force during high-speed traveling can be reduced, and peeling of the sound-absorbing member can be minimized. As a result, the noise reduction effect of the sound-absorbing member can be maintained over a long period of time.

Preferably the belt cover layer is configured from a strip member wound in spiral form in the tire circumferential direction, and in at least a portion of the belt cover layer on the outer side in the tire width direction adjacent windings of the strip member are partially overlapped to form a lap winding structure. In this way, the strain in the tire inner surface due to centrifugal force during high-speed traveling is effectively reduced, so the adhesive layer of the sound-absorbing member can easily follow the tire inner surface.

In forming the lap winding structure of the belt cover layer in at least portions on the outer side in the tire width direction, preferably the edge on the tire equator side of the portion of the belt cover layer having the lap winding structure is located in a region that is away from circumferential main grooves formed in the tread portion. At the edge on the tire equator side of the portion of the belt cover layer having the lap winding structure the method of winding the strip member changes, so the thickness of the belt cover layer in the tire circumference becomes irregular. On the other hand, heat build-up is large in the region below the circumferential main grooves. Therefore, if the edge on the tire equator side of the portion of the belt cover layer having the lap winding structure is disposed in the region below a circumferential main groove, the high-speed durability will be reduced. In contrast, by forming the lap winding structure of the belt cover layer appropriately with respect to the circumferential main grooves as described above, it is possible to avoid a reduction in the high-speed durability.

Preferably each layer of the belt cover layer and the belt edge cover layer have a cord count of not less than 40 per 50 mm width. In this way, the strain in the tire inner surface due to centrifugal force during high-speed traveling is effectively reduced, so the adhesive layer of the sound-absorbing member can easily follow the tire inner surface.

Preferably the belt cover layer or the belt edge cover layer project to the outside in the tire width direction from each of the edges of the belt layers or the belt edge cover layers, and the length of the projection in the tire width direction is from 3 to 7 mm. In this way, the constraint force on each edge of the belt layers is increased, so the high-speed durability can be further improved.

Preferably the cord angle of the belt layer with respect to the tire circumferential direction is from 22 to 38°. High angle belt layers are frequently adopted in order to ensure steering performance in high performance tires for which high-speed traveling is envisaged, but when the cord angle of the belt layers is increased, the radius of curvature on the tire inner surface in a tire meridian cross-section becomes smaller, which causes strain in the bonding surface of the sound-absorbing member. Therefore, in pneumatic tires with such high angle belt layers, if the structure as described above is adopted, a significant effect of improvement in the adhesion durability of the sound-absorbing member can be obtained.

Preferably the belt layer includes an inside belt layer that is the first when counted from the carcass layer side, and an outside belt layer that is the second when counted from the carcass layer side, and the width of the outside belt layer is from 95 to 110% of the tire ground contact width. This ensures excellent high-speed durability.

Preferably the mounting orientation of the pneumatic tire with respect to the vehicle is designated, and when a first ground contact region is specified between the tire ground contact edge on the vehicle inner side and the tire equatorial plane, and a second ground contact region is specified between the tire ground contact edge on the vehicle outer side and the tire equatorial plane, the groove area ratio of the first ground contact region is set larger than the groove area ratio of the second ground contact region. In the pneumatic tire in which the mounting orientation with respect to the vehicle is designated, if the speed rating is high, there is concern over reduction in high-speed durability due to heat build-up at positions on the vehicle inner side depending on the vehicle camber angle setting. By making the groove area ratio of the first ground contact region disposed on the vehicle inner side comparatively large, the heat build-up at positions on the vehicle inner side can be reduced, and the high-speed durability increased.

In the present technology, the tire ground contact edge is the position in the tire axial direction of the ground contact region when the tire is assembled onto a regular rim, inflated with the regular inner pressure, placed vertically on a horizontal surface, and the regular load is applied, and the ground contact width is the width in the tire axial direction of the ground contact region. A "regular rim" is a rim defined by a standard for each tire according to a system of standards that includes standards on which tires are based, and refers to a "standard rim" in the case of Japan Automobile Tyre Manufacturers Association (JATMA), refers to a "Design Rim" in the case of Tire and Rim Association (TRA), and refers to a "Measuring Rim" in the case of European Tyre and Rim Technical Organisation (ETRTO). However, if the tire is to be mounted on a new vehicle, the genuine wheel on which the tire is to be fitted shall be used. "Regular inner pressure" is the air pressure defined by standards for each tire according to a system of standards that includes standards on which tires are based, and refers to the "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However if the tire is to be fitted to a new vehicle, the air pressure shall be that indicated on the vehicle. "Regular load" is the load defined by standards for each tire according to a system of standards that includes standards on which tires are based, and refers to the "maximum load capacity" in the case of JATMA, refers to the maximum value in the table of "TIRE ROAD LIMITS AT VARIOUS COLD INFLATION PRESSURES" in the case of TRA, and refers to the "LOAD CAPACITY" in the case of ETRTO. However the load shall be the equivalent of 88% of this load for a tire on a passenger vehicle. In the case of a tire fitted to a new vehicle, the wheel load shall be obtained by dividing the front and rear axle loads stated in the vehicle inspection certificate of the vehicle by two.

Preferably the sound-absorbing member is a single sound-absorbing member extending in the tire circumferential direction, having a constant thickness at least in the region corresponding to the bonding surface in a cross-section orthogonal to the longitudinal direction of the sound-absorbing member, and the cross-sectional shape thereof is constant along the longitudinal direction. In this way, the capacity of the sound-absorbing member per unit ground contact area is increased as much as possible, and an excellent noise reduction effect can be obtained. Also, the sound-absorbing member can be easily processed to have this shape, so the manufacturing cost is low.

Preferably the volume of the sound-absorbing member as a percentage of the volume of the cavity formed within the tire when the tire is assembled on the rim is more than 20%. By increasing the volume of the sound-absorbing member in this way an excellent noise reduction effect can be obtained, and moreover a good bonding state can be maintained over a long period of time, even with a large sound-absorbing member. The cavity volume is the cavity volume formed between the tire and the rim with the tire assembled onto the regular rim and filled with the regular inner pressure.

Preferably the hardness of the sound-absorbing member is from 60 to 170 N, and the tensile strength of the sound-absorbing member is from 60 to 180 kPa. A sound-absorbing member with these physical properties has excellent durability against shear strain. The hardness of the sound-absorbing member is measured by method D (method for calculating strength after constant 25% compression for 20 seconds) in accordance with JIS-K6400-2 "Flexible cellular polymeric materials—Physical properties—Part 2: Determination of hardness and stress-strain characteristics in compression". Also the tensile strength of the sound-absorbing member is measured in accordance with JIS-K6400-5 "Flexible Cellular Polymeric Materials—Physical Properties—Part 5: Determination Of Tensile Strength, Elongation At Break And Tear Strength".

Preferably the adhesive layer is formed from double-sided adhesive tape, and the peeling adhesive strength thereof is in the range of 8 to 40 N/20 mm. In this way the work of applying the sound-absorbing member and the work of dismantling when the tire is being disposed of can be easily carried out, while maintaining good fixing strength of the sound-absorbing member. The peeling adhesive strength of the double-sided adhesive tape is measured in accordance with JIS-Z0237. In other words, the double-sided adhesive sheet is lined by applying 25 μm thick PET film. Test pieces are prepared by cutting the lined adhesive sheet into squares 20 mm×200 mm. The peeling liner is peeled off the test piece, and the exposed adhesive surface is applied to a stainless steel plate (SUS304, surface finish BA) as the adherend, and a 2 kg roller shall be rolled forward and back over it. After holding the test piece in a 23° C., RH 50% environment for 30 minutes, the test piece shall be peeled at 180° from the SUS plate under a 23° C., RH 50% environment at a pulling speed of 300 mm/minute using a tensile tester to measure the peeling adhesion strength in accordance with JIS Z0237.

DETAILED DESCRIPTION

Figure 1:
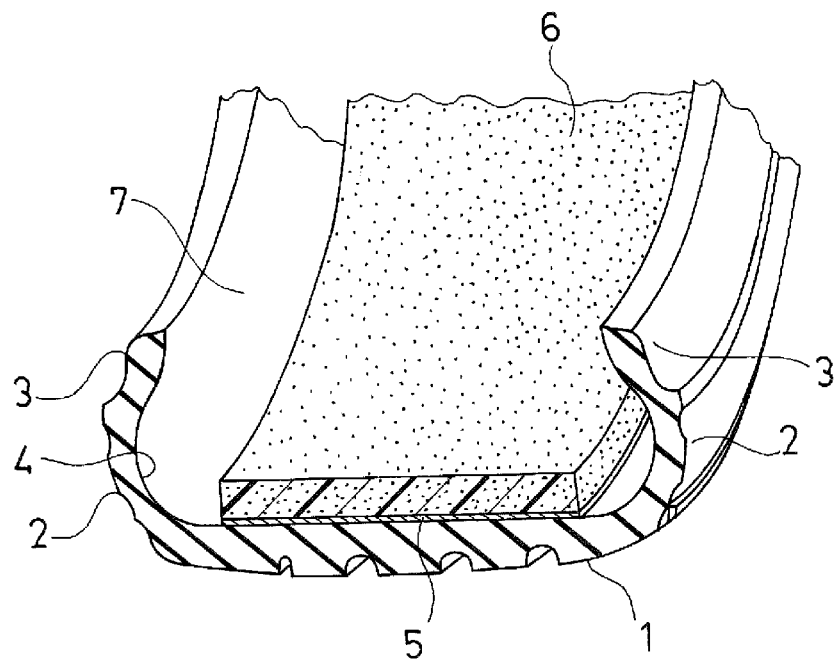
FIG. 1 is a perspective cross-sectional view illustrating a pneumatic tire according to an embodiment of the present technology.
Figure 2:
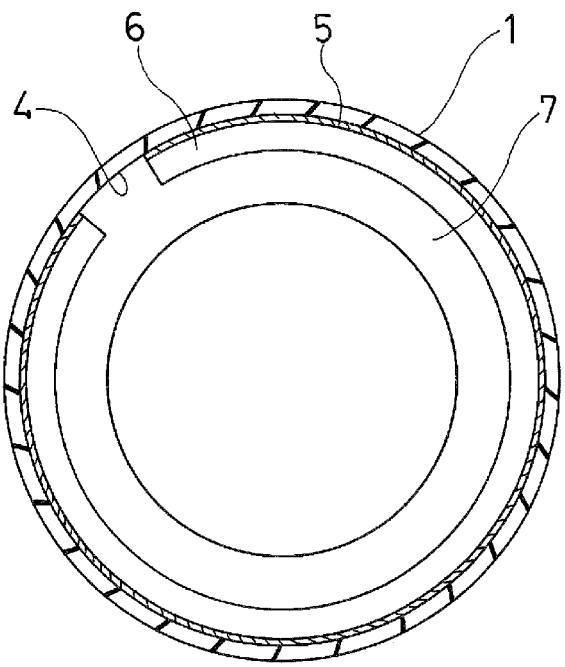
FIG. 2 is a cross-sectional view along the equatorial line illustrating a pneumatic tire according to an embodiment of the present technology.
Figure 3:
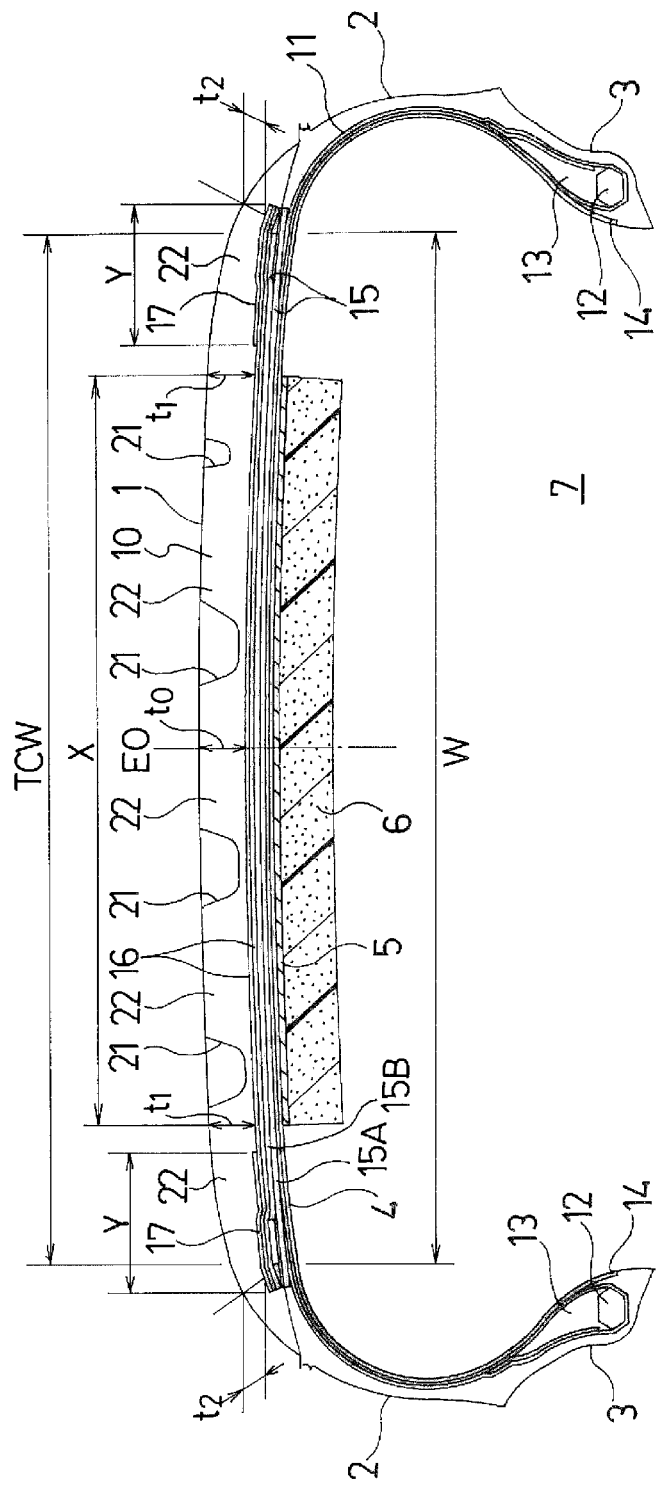
FIG. 3 is a meridian cross-sectional view illustrating a pneumatic tire according to an embodiment of the present technology.

A detailed description of the configuration of the present technology is given below, with reference to the accompanying drawings. FIGS. 1 to 3 illustrate a pneumatic tire according to an embodiment of the present technology. As illustrated in FIGS. 1 and 2, the pneumatic tire according to the present embodiment is provided with an annular-shaped tread portion 1 extending in the tire circumferential direction, a pair of sidewall portions 2 disposed on the two sides of the tread portion 1, and a pair of bead portions 3 disposed on the inner side in the tire radial direction of the sidewall portions 2.

As illustrated in FIG. 3, a carcass layer 11 is mounted between the pair of bead portions 3, 3. The carcass layer 11 includes a plurality of reinforcing cords extending in the tire radial direction, and is folded back around a bead core 12 disposed in each of the bead portions 3 from the tire inner side to the tire outer side. A bead filler 13 having a triangular cross-sectional shape formed from a rubber composition is disposed on the periphery of the bead core 12. An inner liner layer 14 is layered along the tire inner surface 4 inward of the carcass layer 11.

On the other hand, a plurality of belt layers 15 is embedded in the tread portion 1 on the outer circumferential side of the carcass layer 11. These belt layers 15 include a plurality of reinforcing cords that are inclined with respect to the tire circumferential direction, and the reinforcing cords are disposed so that the reinforcing cords of each layer intersect each other. In the belt layers 15, the inclination angle of the reinforcing cords with respect to the tire circumferential direction is set in a range from, for example, 10 to 40°. Steel cords are preferably used as the reinforcing cords of the belt layers 15. For the purpose of enhancing high-speed durability, at least two layers of a belt cover layer 16 formed by arranging reinforcing cords at an angle of, for example, not more than 5° with respect to the tire circumferential direction, are disposed on the outer circumferential side of the belt layers 15 and over the whole width of the belt layers 15. In addition, for the purpose of enhancing high-speed durability, at least one layer of a belt edge cover layer 17 formed by arranging reinforcing cords at an angle of, for example, not more than 5° with respect to the tire circumferential direction, is disposed on the outer circumferential side of the belt cover layer 16 so as to locally cover both edges of the belt layers 15. Aliphatic polyamide fiber cords such as nylon fiber cords or similar are used as the reinforcing cords of the belt cover layer 16 and the belt edge cover layer 17.

A tread rubber layer 10 is disposed on the outer circumferential side of the belt cover layer 16 and the belt edge cover layer 17. Also, a plurality of circumferential main grooves 21 extending in the tire circumferential direction is formed in the tread portion 1. These circumferential main grooves 21 partition a plurality of land portions 22.

In the pneumatic tire as described above, a strip-shaped sound-absorbing member 6 is bonded along the tire circumferential direction to a region of the tire inner surface 4 corresponding to the tread portion 1, via an adhesive layer 5. More specifically, the sound-absorbing member 6 is disposed on the inner side in the tire width direction of the belt edge cover layer 17. The sound-absorbing member 6 is configured from a porous material with open cells, and has predetermined sound absorbing properties based on the porous structure. Polyurethane foam may be used as the porous material of the sound-absorbing member 6. On the other hand, adhesive in paste form or double-sided adhesive tape can be used as the adhesive layer 5.

Also, in the pneumatic tire as described above, the thickness of the tread rubber layer 10 is substantially constant in the range X where the sound-absorbing member 6 is disposed, and the difference in the thickness t1 of the tread rubber layer 10 at the position of the edges of the sound-absorbing member (in other words, the position of the boundary of the region X) and the thickness t0 of the tread rubber layer 10 at the tire equatorial position (the position of the tire equatorial plane EO) is 0.5 mm or less. More preferably the thickness of the tread rubber layer 10 is completely constant in the range X where the sound-absorbing member 6 is disposed, or, there is a gradual reduction from the tire equatorial position towards the outer side in the tire width direction. On the other hand, the thickness of the tread rubber layer 10 in the range Y where the belt edge cover layer 17 is disposed is smaller than the thickness in the range X over which the sound-absorbing member 6 is disposed. The difference between the minimum value t2 of the thickness of the tread rubber layer 10 in the range Y where the belt edge cover layer 17 is disposed and the thickness t0 of the tread rubber layer 10 at the tire equatorial position is from 1.0 to 4.0 mm. Preferably the thickness t0 of the tread rubber layer 10 at the tire equatorial position is set in the range, for example, 7.5 to 10.5 mm. Note that the thickness of the tread rubber layer 10 is measured in the direction of the line normal to the treading surface.

In the pneumatic tire as described above, in bonding the strip-shaped sound-absorbing member 6 along the tire circumferential direction to the region of the tire inner surface 4 corresponding to the tread portion 1 via the adhesive layer 5, the two or more layers of the belt cover layer 16 made from aliphatic polyamide fiber cords oriented in the tire circumferential direction are disposed on the outer circumferential side of the belt layers 15 over the full width thereof, and the one or more layers of the belt edge cover layer 17 made from aliphatic polyamide fiber cords oriented in the tire circumferential direction are disposed on the outer circumferential side of the belt cover layer 16 so as to cover both edges of the belt layers 15. In other words, a sufficient number of layers of the belt cover layer 16 and a sufficient number of layers of the belt edge cover layer 17 are provided. Therefore, even when inexpensive aliphatic polyamide fiber codes are used in the belt cover layer 16 and the belt edge cover layer 17, a sufficient hoop effect is obtained based on the belt cover layer 16 and the belt edge cover layer 17, so the strain produced in the tire inner surface 4 due to radial growth caused by centrifugal force during high-speed traveling can be reduced. In this way, the adhesive layer 5 of the sound-absorbing member 6 can easily follow the tire inner surface 4, and peeling of the sound-absorbing member 6 can be reduced.

Moreover, the thickness of the tread rubber layer 10 in the range X where the sound-absorbing member 6 is disposed is substantially constant, so the effect of reducing the strain in the tire inner surface 4 can be increased when the tread portion 1 makes ground contact. Also, in the shoulder region of the tread portion 1 generally heat build-up tends to be large at the position where the belt edge cover layer 17 is disposed. However the thickness of the tread rubber layer 10 in the region Y where the belt edge cover layer 17 is disposed is less than the thickness in the region X where the sound-absorbing member 6 is disposed, so the heat build-up at the position where the belt edge cover layer 17 is disposed is reduced, so excellent high-speed durability can be exhibited. In this way excellent high-speed durability can be maintained, strains of the tire inner surface 4 due to centrifugal force during high-speed traveling can be reduced, and peeling of the sound-absorbing member 6 can be minimized. As a result, the noise reduction effect of the sound-absorbing member 6 can be maintained over a long period of time. In particular a significant effect can be obtained for pneumatic tires with a speed indicated by the embossed speed rating code (JATMA, ETRTO, TRA) in excess of 270 km/h.

Here, if the difference between the thickness t1 of the tread rubber layer 10 at the position of the sound-absorbing member edge and the thickness t0 at the tire equatorial position is greater than 0.5 mm, the strain at the tire inner surface 4 when the tread portion 1 makes ground contact increases, so the sound-absorbing member 6 can easily be peeled off. Also, if the difference between the minimum value t2 of the thickness in the region Y of the tread rubber layer 10 where the belt edge cover layer 17 is disposed and the thickness t0 of the tread rubber layer 10 at the tire equatorial position is smaller than 1.0 mm, heat build-up can easily occur in the shoulder regions, so the high-speed durability is reduced, and conversely if it is greater than 4.0 mm the noise performance deteriorates due to the reduction in stiffness of the shoulder region, so the noise reduction effect of the sound-absorbing member 6 is reduced.

Also, in the range Y where the belt edge cover layer 17 is disposed the heat build-up is large due to the tire structure, but the sound-absorbing member 6 is disposed on the inner side in the tire width direction of the belt edge cover layer 17, so from this point of view also degradation of the adhesive layer 5 of the sound-absorbing member 6 can be prevented. In particular, preferably the sound-absorbing member 6 is disposed over a range of 60 to 90% of the width of the region between the belt edge cover layers 17.

Figure 4:
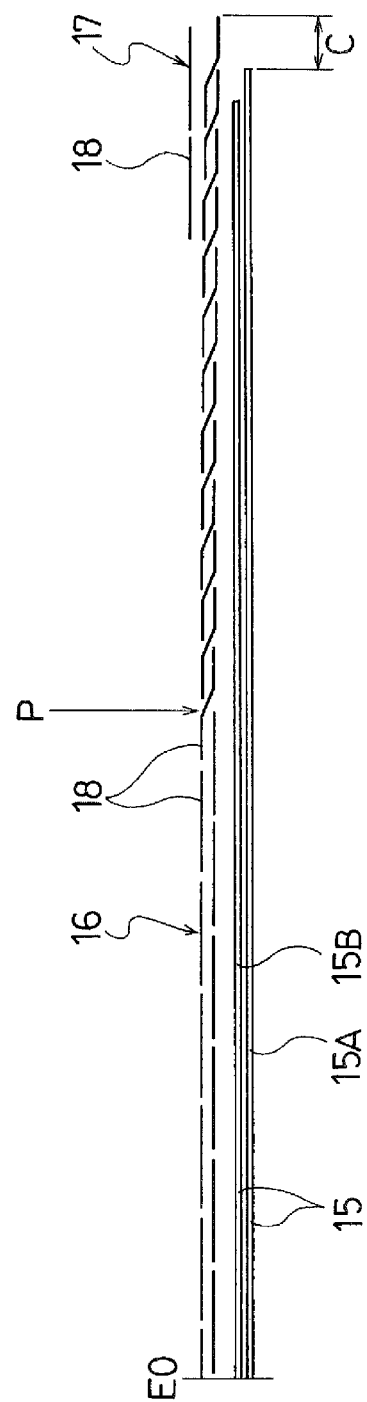
FIG. 4 is a half cross-sectional view illustrating an example of the belt layer and belt cover layer in the pneumatic tire according to the present technology.

FIG. 4 illustrates a specific example of the belt layer and belt cover layer in the pneumatic tire according to the present technology. In FIG. 4, the belt cover layer 16 and the belt edge cover layer 17 are formed by winding in a spiral form along the tire circumferential direction a strip member 18 formed by covering with rubber a plurality of aliphatic polyamide fiber cords arranged in parallel. Each layer of the belt cover layer 16 and the belt edge cover layer 17 can be formed separately, but the plurality of layers can also be formed continuously from a series of strip members 18.

In this specific example, the portion of the belt cover layer 16 on the inner side in the tire width direction is formed with a structure in which adjacent windings of the strip member 18 butt against each other. However the portion of the belt cover layer 16 on the outer side in the tire width direction is formed with a lap winding structure in which adjacent windings of the strip member 18 are partially overlapped. In other words, in the portion of the belt cover layer 16 on the inner side in the tire width direction two layers of the belt cover layer 16 are formed as independent layers. However, in the portion of the belt cover layer 16 on the outer side in the tire width direction two layers of the belt cover layer 16 are integrally formed by overlapping the strip member 18. In this case a good hoop effect can be exhibited by joining together windings of the strip member 18 that are adjacent in the tire width direction. In this way, the strain in the tire inner surface 4 due to centrifugal force during high-speed traveling is effectively reduced, so the adhesive layer 5 of the sound-absorbing member 6 can easily follow the tire inner surface 4. Note that in FIG. 4 one side of the tire equatorial plane E0 is illustrated, but an overlapping winding structure may be formed in the two outer side portions of the belt cover layer 16 in the tire width direction.

In forming the lap winding structure of the belt cover layer 16 in at least portions on the outer side in the tire width direction, preferably the edge on the tire equator side of the portion of the belt cover layer 16 having the lap winding structure (the position of the arrow P in FIG. 4) is located in a region that is away from the circumferential main grooves 21 formed in the tread portion 1. At the edge on the tire equator side of the portion of the belt cover layer 16 having the lap winding structure the method of winding the strip member 18 changes, so the thickness of the belt cover layer 16 in the tire circumference becomes irregular. On the other hand, heat build-up is large in the region below the circumferential main grooves 21. Therefore, if the edge on the tire equator side of the portion of the belt cover layer 16 having the lap winding structure is disposed in the region below a circumferential main groove 21, the high-speed durability will be reduced. In contrast, by forming the lap winding structure of the belt cover layer 16 appropriately with respect to the circumferential main grooves 21 as described above, it is possible to avoid a reduction in the high-speed durability. In particular, the edge on the tire equator side of the portion of the belt cover layer 16 having the lap winding structure may be disposed in a position not less than 2 mm along the tire width direction from the opening edge of the circumferential main grooves 21.

Each layer of the belt cover layer 16 and the belt edge cover layer 17 may have a cord count of not less than 40 per 50 mm width. In this way, the strain in the tire inner surface 4 due to centrifugal force during high-speed traveling is effectively reduced, so the adhesive layer 5 of the sound-absorbing member 6 can easily follow the tire inner surface 4. If the cord count is less than 40, the strain reduction effect is reduced. In particular, preferably the cord count of the belt cover layer 16 per 50 mm width is not less than 50, more preferably it is not less than 60, still more preferably it is not less than 65, and the upper limit value should be 90.

As illustrated in FIG. 4, the belt cover layer 16 and the belt edge cover layer 17 project to the outside in the tire width direction from each of the edges of the belt layers 15, and the length of the projection in the tire width direction may be from 3 to 7 mm. In this way, the constraint force on each edge of the belt layers 15 is increased, so the high-speed durability can be further improved. In particular, by providing the lap winding structure in the belt cover layer 16 and at the same time setting the length of the projection C in the above range, the high-speed durability improvement effect is significant. If the length of the projection C is less than 3 mm, it is not possible to obtain a further improvement effect in the high-speed durability, and conversely if it is longer than 7 mm, there are difficulties in manufacture.

In the pneumatic tire as described above, the cord angle of the belt layers 15 with respect to the tire circumferential direction may be from 22 to 38°. When high angle belt layers 15 are adopted in order to ensure steering performance in high performance tires for which high-speed traveling is envisaged, when the cord angle of the belt layers 15 is increased, the radius of curvature on the tire inner surface in a tire meridian cross-section becomes smaller, which causes strain in the bonding surface of the sound-absorbing member 6. Therefore, in pneumatic tires with such high angle belt layers 15, if the structure to reduce the strain of the tire inner surface 4 as described above is adopted, a significant effect of improvement in the bonding durability of the sound-absorbing member 6 can be obtained. The cord angle of the belt layers 15 with respect to the tire circumferential direction is preferably from 28 to 36°, more preferably from 29 to 35°, and still more preferably from 30 to 34°.

As illustrated in FIGS. 3 and 4, the belt layers 15 include a first inside belt layer 15A counted from the carcass layer 11 side and a second outside belt layer 15B counted from the carcass layer 11 side. However the width W of the outside belt layer 15B may be from 95 to 110% of the tire ground contact width TCW. This ensures excellent high-speed durability. If the width W of the outside belt layer 15B extends outside the above range, the high-speed durability improvement effect will be reduced. In particular, preferably the width W of the outside belt layer 15B is from 95 to 105% of the tire ground contact width TCW.

Figure 5:
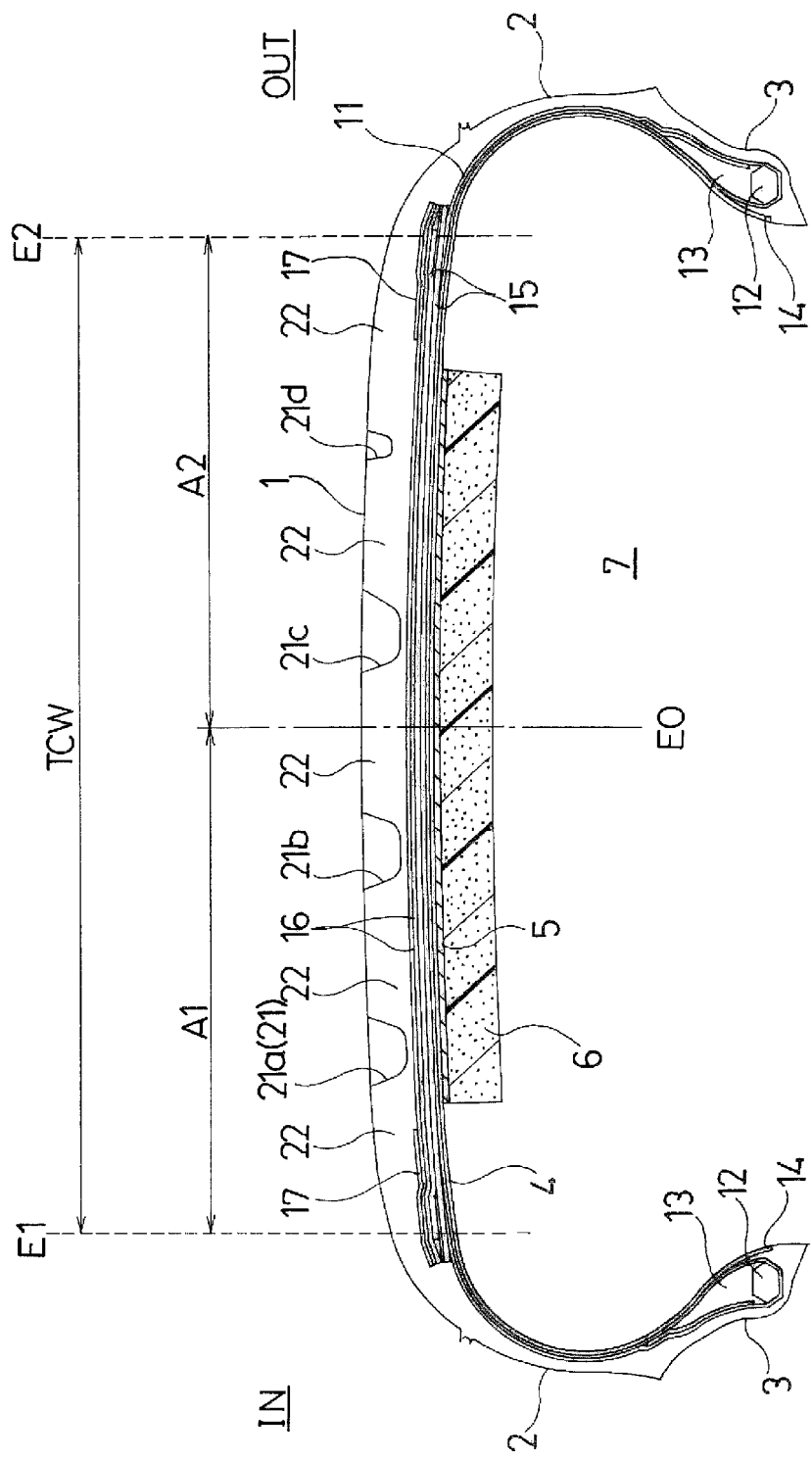
FIG. 5 is a meridian cross-sectional view illustrating a pneumatic tire according to another embodiment of the present technology.
Figure 6:
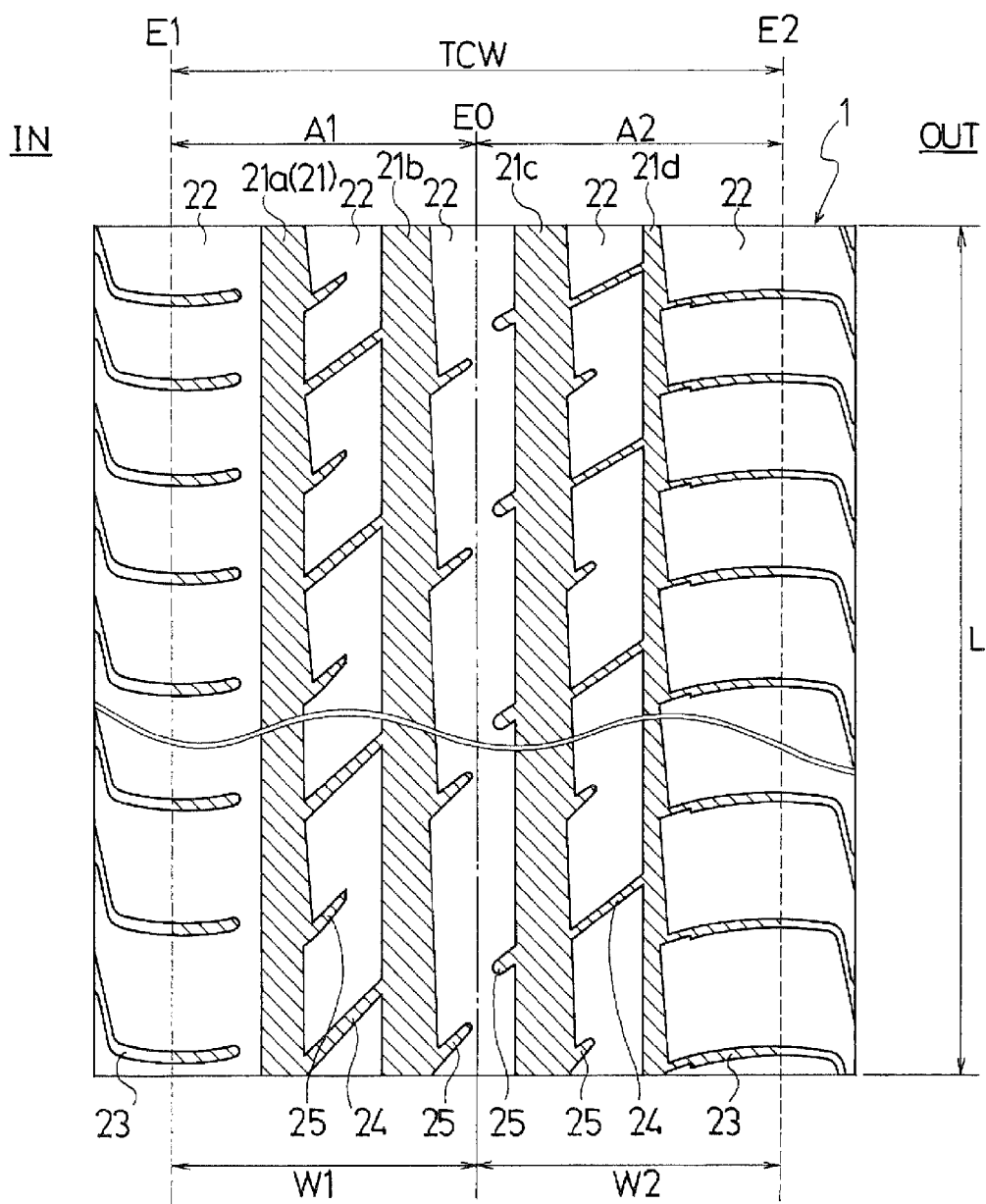
FIG. 6 is a developed view illustrating a tread pattern of a pneumatic tire according to another embodiment of the present technology.

FIGS. 5 and 6 illustrate a pneumatic tire according to another embodiment of the present technology. The pneumatic tire is a tire having a designated tire front/back mounting direction when mounted on a vehicle. In FIG. 5, "IN" refers to a vehicle inner side of the pneumatic tire when mounted on a vehicle and "OUT" refers to a vehicle outer side when mounted on a vehicle. Such a mounting orientation with respect to the vehicle is displayed on the tire outer surface. In FIG. 5 and FIG. 6, components which are the same as those shown in FIGS. 1 to 4 will be denoted by the same reference numerals. Detailed descriptions for these components will be omitted.

As illustrated in FIG. 5, a pneumatic tire of this embodiment is provided with a tread portion 1 extending in the tire circumferential direction to form an annular shape, a pair of sidewall portions 2 that is disposed on both sides of the tread portion 1, and a pair of bead portions 3 that is disposed on the inner side in the tire radial direction of the sidewall portions 2. Also, a strip-shaped sound-absorbing member 6 is bonded along the tire circumferential direction to a region of the tire inner surface 4 corresponding to the tread portion 1, via an adhesive layer 5.

As illustrated in FIG. 6, the required groove pattern is formed in the tread portion 1. In other words, four circumferential main grooves 21 (21a, 21b, 21c, 21d) extending in the tire circumferential direction are formed in the tread portion 1. These circumferential main grooves 21 partition and form five land portions 22. The groove width of the circumferential groove 21d located on the vehicle outer side is narrower than that of the other circumferential grooves 21a to 21c. Also, lug grooves 23 and inclined grooves 24 and notch grooves 25 are formed extending in the tire width direction on these land portions 22.

In such a pneumatic tire with the mounting orientation with respect to the vehicle designated, when a first ground contact region A1 is specified between the tire ground contact edge E1 on the vehicle inner side and the tire equatorial plane E0, and a second ground contact region A2 is specified between the tire ground contact edge E2 on the vehicle outer side and the tire equatorial plane E0, the groove area ratio R1 of the first ground contact region A1 is set larger than the groove area ratio R2 of the second ground contact region A2.

The groove area ratio R1 of the first ground contact region A1 and the groove area ratio R2 of the second ground contact region A2 are specified on the basis of groove patterns including the circumferential grooves 21, the lug grooves 23, the inclined grooves 24, and the notch grooves 25 formed in the tread portion 1. More specifically, as illustrated in FIG. 6, if the width of the first ground contact region A1 is W1, the width of the second ground contact region A2 is W2, and the tire circumferential length is L, the total area S1 of the first ground contact region A1 and the total area S2 of the second ground contact region A2 are calculated from S1=W1×L and S2=W2×L respectively. The total groove area G1 of the first ground contact region A1 is the area of the portion (hatched portion) of the tread surface within the first ground contact region A1 that does not contact the ground over the entire periphery. Similarly the total groove area G2 of the second ground contact region A2 is the area of the portion (hatched portion) of the tread surface within the second ground contact region A2 that does not contact the ground over the entire periphery. Then the groove area ratio R1 of the first ground contact region A1 and the groove area ratio R2 of the second ground contact region A2 are calculated from R1=G1/S1×100% and R2=G2/S2×100% respectively.

In the pneumatic tire in which the mounting orientation with respect to the vehicle is designated, if the speed rating is high, there is concern over reduction in high-speed durability due to heat build-up at positions on the vehicle inner side depending on the vehicle camber angle setting. By making the groove area ratio R1 of the first ground contact region A1 disposed on the vehicle inner side comparatively large, the heat build-up at positions on the vehicle inner side can be reduced, and the high-speed durability increased. Preferably the difference between the groove area ratio R1 of the first ground contact region A1 and the groove area ratio R2 of the second ground contact region A2 is from 5 to 15%.

In the pneumatic tire as described above, preferably a single sound-absorbing member 6 extends in the tire circumferential direction, in a cross-section orthogonal to the longitudinal direction of the sound-absorbing member 6, the sound-absorbing member 6 has a constant thickness at least in the region corresponding to the bonding surface, and the cross-sectional shape is constant along the longitudinal direction. In particular, preferably the cross-sectional shape in a cross-section orthogonal to the longitudinal direction of the sound-absorbing member 6 is a rectangular shape (including a square shape), but depending on the circumstances it can be an inverted trapezoid so that it becomes narrower towards the ground contact surface side. In this way, the capacity of the sound-absorbing member 6 per unit ground contact area is increased as much as possible, and an excellent noise reduction effect can be obtained. Also, the sound-absorbing member 6 can be easily processed to have this shape, so the manufacturing cost is low.

When the pneumatic tire as described above is assembled onto a rim, a cavity 7 is formed between the tire inner surface 4 and the rim. Preferably the volume of the sound-absorbing member 6 is greater than 20% of the volume of the cavity 7. By increasing the volume of the sound-absorbing member 6 in this way an excellent noise reduction effect can be obtained, and moreover a good bonding state can be maintained over a long period of time, even with a large sound-absorbing member 6. Note that preferably the width of the sound-absorbing member 6 is in the range of 30 to 90% of the ground contact width. Also, preferably the sound-absorbing member 6 is not an annular shape.

Preferably the hardness of the sound-absorbing member 6 (JIS-K6400-2) is from 60 to 170 N, and the tensile strength of the sound-absorbing member 6 (JIS-K6400-5) is from 60 to 180 kPa. A sound-absorbing member 6 having these physical properties has excellent durability against shear strain. If the hardness or the tensile strength of the sound-absorbing member 6 are too low, the durability of the sound-absorbing member 6 will be reduced. In particular, preferably the hardness of the sound-absorbing member 6 is from 70 to 160 N, and more preferably from 80 to 140 N. Also, preferably the tensile strength of the sound-absorbing member 6 is from 75 to 165 kPa, and more preferably from 90 to 150 kPa.

Preferably the peeling adhesive strength (JIS-Z0237: 2009) of the adhesive layer 5 is in the range of 8 to 40 N/20 mm. In this way the work of applying the sound-absorbing member 6 and the work of dismantling when the tire is being disposed of can be easily carried out, while maintaining good fixing strength of the sound-absorbing member 6. In other words, if the peeling strength of the adhesive layer 5 is too low the fixing state of the sound-absorbing member 6 will be unstable, and conversely if the peeling strength of the adhesive layer 5 is too high it will be difficult to change the fixing position during the operation of bonding the sound-absorbing member 6, and it will be difficult to peel off the sound-absorbing member 6 when the tire is being disposed of. In particular, preferably the peeling adhesive strength of the adhesive layer 5 is from 9 to 30 N/20 mm, and more preferably from 10 to 25 N/20 mm.

EXAMPLES

Pneumatic tires according to Comparative Examples 1 to 3 and Working Examples 1 to 4 were manufactured to a tire size 275/35R20, having an annular tread portion extending in the tire circumferential direction, a pair of sidewall portions disposed on the two sides of the tread portion, and a pair of bead portions on the inner side in the tire radial direction of the sidewall portions. A strip-shaped sound-absorbing member was bonded to the region of the tire inner surface corresponding to the tread portion along the tire circumferential direction. A carcass layer was mounted between the pair of bead portions, and two layers of belt layers were disposed on the outer circumferential side of the carcass layer in the tread portion. A belt cover layer made from aliphatic polyamide fiber cords oriented in the tire circumferential direction was disposed on the outer circumferential side of the belt layers and extending over the whole width of the belt layers. A belt edge cover layer made from aliphatic polyamide fiber cords oriented in the tire circumferential direction was disposed on the outer circumferential side of the belt cover layer so as to cover the two edges of the belt layers. A tread rubber layer was disposed on the outer circumferential side of the belt cover layer and the belt edge cover layer. The sound-absorbing member was disposed on the inner side in the tire width direction of the belt edge cover layer. The number of layers of the belt cover layer, the number of layers of the belt edge cover layer, the thickness t0 of the tread rubber layer at the tire equator position, the thickness t1 of the tread rubber layer at the position of the sound-absorbing member edge, the minimum value t2 of the thickness of the tread rubber layer over the range in which the belt edge cover layer is disposed, the presence or absence of a lap winding structure (FIG. 4) in the belt cover layer, and the length of projection of the belt cover layer were varied.

The above pneumatic tires were tires with a designated mounting orientation with respect to the vehicle. The groove area ratio of the first ground contact region disposed on the vehicle inner side was 35%, and the groove area ratio of the second ground contact region disposed on the vehicle outer side was 30%.

In Comparative Examples 1 to 3 and Working Examples 1 to 4, the following items were common. Each layer of the belt cover layer and the belt edge cover layer had a cord count of 40 per 50 mm width. The cord angle of the belt layer with respect to the tire circumferential direction was 32°. The width of the outside belt layer was 100% of the ground contact width. The cross-sectional shape of the sound-absorbing member in a cross-section orthogonal to the longitudinal direction was a rectangular shape, and this cross-sectional shape is constant along the tire circumferential direction. The volume of the sound-absorbing member as a percentage of the volume of the cavity formed within the tire when the tire was assembled on the rim was 25%. The hardness of the sound-absorbing member was 91 N, and the tensile strength of the sound-absorbing member was 132 kPa. The peeling adhesive strength of the adhesive layer was 16 N/20 mm.

The high-speed durability and the peeling of the sound-absorbing member were evaluated for these test tires according to the following evaluation methods, and the results thereof are shown in Table 1. High-speed durability:

Each test tire was assembled onto a wheel with a rim size 20×9.5 J, and a high-speed durability test was carried out using a drum testing machine under the conditions of air pressure 200 kPa, load 6.6 kN, and speed 280 km/h, and the traveling distance until the occurrence of tire failure was measured. Evaluation results were expressed as index values, Comparative Example 1 being assigned an index value of 100. Larger index values indicate superior high-speed durability.

Adhesive Peeling of the Sound-Absorbing Member:

Each test tire was assembled onto a wheel with a rim size 20×9.5 J, and after a high-speed durability test was carried out for 10 hours using a drum testing machine under the conditions of air pressure 270 kPa, load 6.6 kN, and speed 280 km/h, it was visually checked whether or not there was adhesive peeling of the sound-absorbing member. Also, as the index of the resistance to adhesive peeling, running tests were carried out using the drum testing machine under the same conditions as described above, and every hour it was checked whether or not there was adhesive peeling of the sound-absorbing member, and the distance traveled until adhesive peeling occurred was obtained. Evaluation results for resistance to adhesive peeling were expressed as index vales, Comparative Example 1 being assigned an index value of 100. Larger index values indicate superior resistance to adhesive peeling.

TABLE 1

|  | Comparative Example 1 | Comparative Example 2 | Comparative Example 3 |
|---|---|---|---|
| Number of layers of the belt cover layer | 1 | 2 | 2 |
| Number of layers of the belt edge cover layer | 1 | 1 | 1 |
| Thickness of the tread rubber layer t0 (mm) | 9.5 | 9.5 | 9.5 |
| Thickness of the tread rubber layer t1 (mm) | 9.0 | 8.5 | 9.0 |
| Thickness of the tread rubber layer t2 (mm) | 8.5 | 8.0 | 9.0 |
| Presence/absence of lap winding structure in belt cover layer | Absence | Absence | Absence |
| Projection length of belt cover layer (mm) | 0 | 0 | 0 |
| High-speed durability (index) | 100 | 120 | 115 |
| Presence/absence of adhesive peeling of the sound-absorbing member | Presence | Presence | Presence |
| Resistance to adhesive peeling | 100 | 100 | 100 |

|  | Working Example 1 | Working Example 2 | Working Example 3 | Working Example 4 |
|---|---|---|---|---|
| Number of layers of the belt cover layer | 2 | 2 | 2 | 2 |
| Number of layers of the belt edge cover layer | 1 | 1 | 1 | 1 |
| Thickness of the tread rubber layer t0 (mm) | 9.5 | 9.5 | 9.5 | 9.5 |
| Thickness of the tread rubber layer t1 (mm) | 9.0 | 9.0 | 9.0 | 9.0 |
| Thickness of the tread rubber layer t2 (mm) | 8.5 | 7.0 | 7.0 | 7.0 |
| Presence/absence of lap winding structure in belt cover layer | Absence | Absence | Presence | Presence |
| Projection length of belt cover layer (mm) | 0 | 0 | 0 | 5 |
| High-speed durability (index) | 120 | 125 | 130 | 140 |
| Presence/absence of adhesive peeling of the sound-absorbing member | Absence | Absence | Absence | Absence |
| Resistance to adhesive peeling | 110 | 120 | 125 | 130 |

As shown in Table 1, with the tire of Comparative Example 1 there was significant occurrence of adhesive peeling of the sound-absorbing member after 10 hours of the running test, but in the case of the tires of Working Examples 1 to 4, there was no adhesive peeling of the sound-absorbing member observed after 10 hours of the running test, and moreover the high-speed durability was improved. On the other hand, with the tire of Comparative Example 2, the difference between the thickness t1 of the tread rubber layer at the position of the edge of the sound-absorbing member and the thickness t0 of the tread rubber layer at the position of the tire equator was too large, so after 10 hours of the running test adhesive peeling of the sound-absorbing member occurred. Also, with the tire of Comparative Example 3, the difference between the minimum value t2 of the thickness of the tread rubber layer over the range that the belt edge cover layer was disposed and the thickness t0 of the tread rubber layer at the position of the tire equator was too small. As a result a sufficient improvement effect of the high-speed durability could not be obtained, and after 10 hours of the running tests adhesive peeling of the sound-absorbing member also occurred.

Next, tires in accordance with Working Examples 5 to 10 were prepared having the same structure as Working Example 1 except that the hardness of the sound-absorbing member, the tensile strength of the sound-absorbing member, the peeling adhesive strength of the adhesive layer, and the cord count per 50 mm width of the belt cover layer and the belt edge cover layer were varied.

The high-speed durability and the adhesive peeling of the sound-absorbing member were evaluated for the tires according to Working Examples 5 to 10 by the same methods as described above. The results were recorded in Table 2.

TABLE 2

|  | Working Example 5 | Working Example 6 | Working Example 7 |
|---|---|---|---|
| Number of layers of the belt cover layer | 2 | 2 | 2 |
| Number of layers of the belt edge cover layer | 1 | 1 | 1 |
| Cord count (cords/mm) | 40 | 40 | 40 |
| Thickness of the tread rubber layer t0 (mm) | 9.5 | 9.5 | 9.5 |
| Thickness of the tread rubber layer t1 (mm) | 9.0 | 9.0 | 9.0 |
| Thickness of the tread rubber layer t2 (mm) | 8.5 | 8.5 | 8.5 |
| Presence/absence of lap winding structure in belt cover layer | Absence | Absence | Absence |
| Projection length of belt cover layer (mm) | 0 | 0 | 0 |
| Hardness of sound-absorbing member (N) | 60 | 170 | 91 |
| Tensile strength of sound-absorbing member (kPa) | 60 | 180 | 132 |
| Peeling adhesive strength of the adhesive (N/20 mm) | 16 | 16 | 8 |
| High-speed durability (index) | 120 | 120 | 120 |
| Presence/absence of adhesive peeling of the sound-absorbing member | Absence | Absence | Absence |
| Resistance to adhesive peeling | 110 | 110 | 105 |

|  | Working Example 8 | Working Example 9 | Working Example 10 |
|---|---|---|---|
| Number of layers of the belt cover layer | 2 | 2 | 2 |
| Number of layers of the belt edge cover layer | 1 | 1 | 1 |
| Cord count (cords/mm) | 40 | 35 | 50 |
| Thickness of the tread rubber layer t0 (mm) | 9.5 | 9.5 | 9.5 |
| Thickness of the tread rubber layer t1 (mm) | 9.0 | 9.0 | 9.0 |
| Thickness of the tread rubber layer t2 (mm) | 8.5 | 8.5 | 8.5 |
| Presence/absence of lap winding structure in belt cover layer | Absence | Absence | Presence |
| Projection length of belt cover layer (mm) | 0 | 0 | 0 |
| Hardness of sound-absorbing member (N) | 91 | 91 | 91 |
| Tensile strength of sound-absorbing member (kPa) | 132 | 132 | 132 |
| Peeling adhesive strength of the adhesive (N/20 mm) | 40 | 16 | 16 |
| High-speed durability (index) | 120 | 115 | 125 |
| Presence/absence of adhesive peeling of the sound-absorbing member | Absence | Absence | Absence |
| Resistance to adhesive peeling | 115 | 108 | 115 |

As shown in Table 2, with the tires according to Working Examples 5 to 8 in which the hardness of the sound-absorbing member, the tensile strength of the sound-absorbing member, and the thickness of the adhesive layer were varied, it was possible to obtain good high-speed durability, the same as for Working Example 1, and moreover there was no adhesive peeling of the sound-absorbing member found after 10 hours of the running test. Also, as is clear from a comparison of Working Example 1 and Working Examples 9 and 10, the high-speed durability improvement effect is increased by increasing the cord count per 50 mm width of the belt cover layer and the belt edge cover layer, and in addition the resistance to adhesive peeling improvement effect is also increased.

The invention claimed is:
1. A pneumatic tire, comprising:
an annular tread portion extending in a tire circumferential direction and having formed therein a plurality of grooves including a plurality of circumferential main grooves extending in the tire circumferential direction;
a pair of sidewall portions disposed on two sides of the tread portion;
a pair of bead portions disposed on an inner side in a tire radial direction of the sidewall portions;
a strip-shaped sound-absorbing member bonded to a region of a tire inner surface having an axial width equal to a ground contact width of the tread portion along the tire circumferential direction via an adhesive layer;
a carcass layer provided between the pair of bead portions;
a plurality of belt layers disposed on an outer circumferential side of the carcass layer in the tread portion;
a belt cover layer made from two or more layers of aliphatic polyamide fiber cords oriented not more than 5° with respect to the tire circumferential direction disposed on an outer circumferential side of the belt layer and extending over the whole width of the belt layer;
a belt edge cover layer made from one or more layers of aliphatic polyamide fiber cords oriented not more than 5° with respect to the tire circumferential direction disposed on an outer circumferential side of the belt cover layer so as to cover two edges of the belt layers; and
a tread rubber layer disposed on an outer circumferential side of the belt cover layer and the belt edge cover layer;
the sound-absorbing member being disposed on an inner side in the tire width direction of the belt edge cover layer;
a thickness of the tread rubber layer being substantially constant in a region over which the sound-absorbing member is disposed such that a difference in a thickness of the tread rubber layer at a position of edges of the sound-absorbing member and a thickness of the tread rubber layer at a position of a tire equator is not more than 0.5 mm,
a thickness of the tread rubber layer in a range over which the belt edge cover layer is disposed being smaller than a thickness over a range in which the sound-absorbing member is disposed; and
a difference between the minimum value of the thickness of the tread rubber layer over the range in which the belt edge cover layer is disposed and the thickness of the tread rubber layer at the position of the tire equator is from 1.0 to 4.0 mm; wherein
the belt cover layer is configured from a strip member wound in spiral form in the tire circumferential direction,
in the portion of the belt cover layer on the inner side in the tire width direction, all adjacent windings of the strip member butt against each other to form an abutting winding structure,
in one of the two portions of the belt cover layer on the outer side in the tire width direction, all adjacent windings of the strip member are partially overlapped to form a lap winding structure, and, in the other of the two portions of the belt cover layer on the outer side in the tire width direction, either all adjacent windings of the strip member butt against each other to form an abutting winding structure or all adjacent windings of the strip member are partially overlapped to form a lap winding structure, and the edge on the tire equator side of each portion of the belt cover layer having the lap winding structure is not disposed radially below any of the circumferential main grooves formed in the tread portion.

2. The pneumatic tire according to claim 1, wherein each layer of the belt cover layer and the belt edge cover layer has a cord count of not less than 40 per 50 mm width.

3. The pneumatic tire according to claim 1, wherein the belt cover layer or the belt edge cover layer project to the outside in the tire width direction from each of the edges of the belt layer, and a length of the projection in the tire width direction is from 3 to 7 mm.

4. The pneumatic tire according to claim 1, wherein each belt layer includes a plurality of reinforcing cords inclined with respect to the tire circumferential direction, the cords of adjacent belt layers intersecting each other, and the cord angle of each belt layer with respect to the tire circumferential direction is from 22 to 38°.

5. The pneumatic tire according to claim 1, wherein the plurality of belt layers include an inside belt layer that is the first when counted from the carcass layer side, and an outside belt layer that is the second when counted from the carcass layer side, and a width of the outside belt layer is from 95 to 110% of the ground contact width of the tread portion.

6. The pneumatic tire according to claim 1, wherein a mounting orientation of the pneumatic tire with respect to a vehicle is displayed on the tire outer surface, and when a first ground contact region is specified between a tire ground contact edge on a vehicle inner side and the tire equator, and a second ground contact region is specified between a tire ground contact edge on the vehicle outer side and the tire equator, the groove area ratio of the first ground contact region is set larger than the groove area ratio of the second ground contact region.

7. The pneumatic tire according to claim 1, wherein the sound-absorbing member is a single sound-absorbing member extending in the tire circumferential direction, having a constant thickness at least in a region corresponding to the bonding surface in a cross-section orthogonal to a longitudinal direction of the sound-absorbing member, and the cross-sectional shape thereof is constant along the longitudinal direction.

8. The pneumatic tire according to claim 1, wherein a volume of the sound-absorbing member as a percentage of a volume of a cavity formed within the tire when the tire is assembled on a regular rim and filled with a regular inner pressure is more than 20%.

9. The pneumatic tire according to claim 1, wherein a hardness of the sound-absorbing member is from 60 to 170 N, and a tensile strength of the sound-absorbing member is from 60 to 180 kPa.

10. The pneumatic tire according to claim 1, wherein the adhesive layer is made from double-sided adhesive tape, with a peeling adhesive strength in the range of 8 to 40 N/20 mm.

11. The pneumatic tire according to claim 1, wherein the sound-absorbing member is configured from a porous material having open cells.

12. The pneumatic tire according to claim 11, wherein the sound-absorbing member is polyurethane foam.

* * * * *